INVENTOR.
AARON F. SAMMET

INVENTOR.
AARON F. SAMMET

Sept. 5, 1967　　　　　A. F. SAMMET　　　　　3,339,556
AGRICULTURAL IMPLEMENT
Original Filed Nov. 28, 1961　　　　　　　　　3 Sheets-Sheet 3
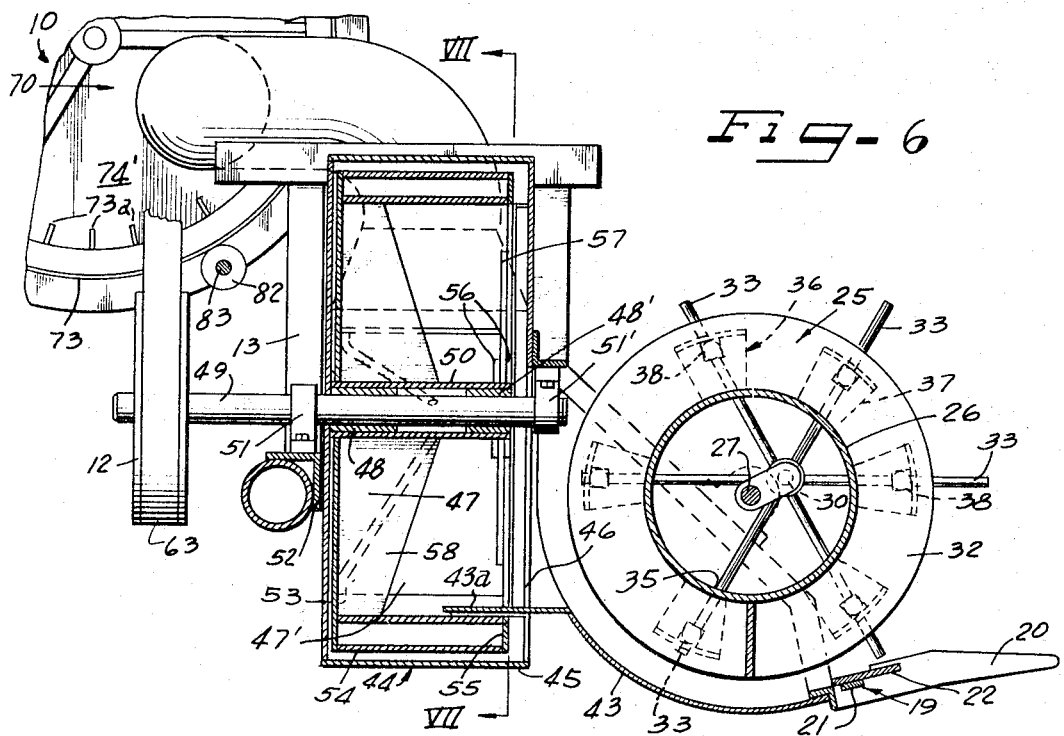
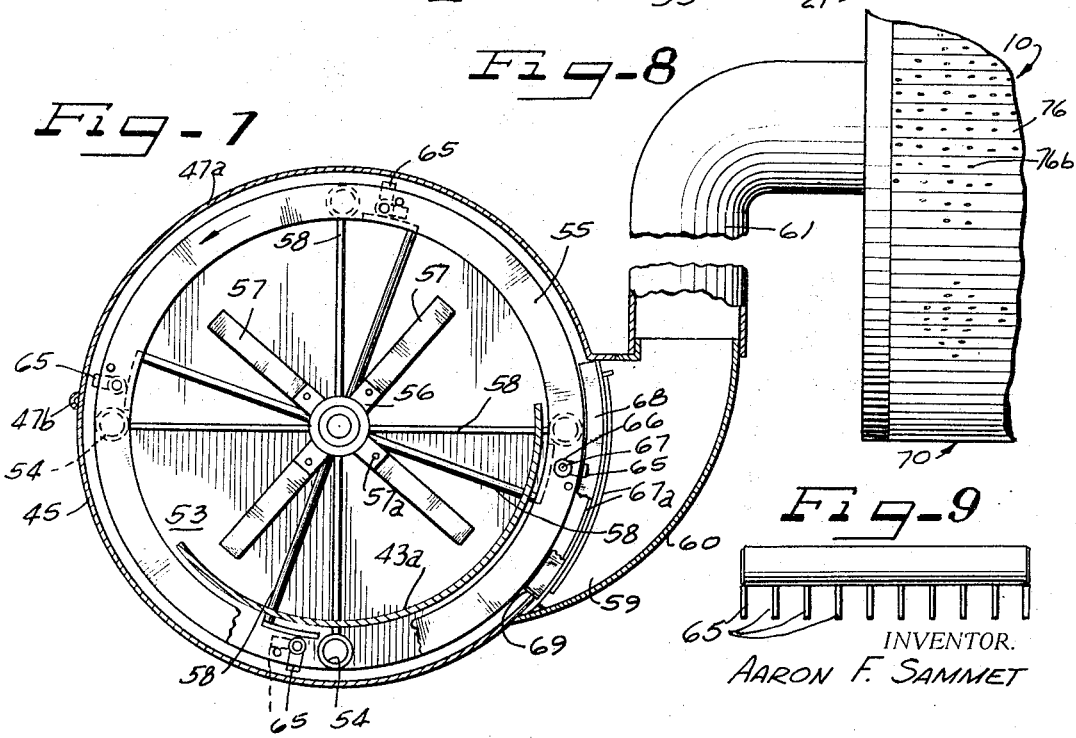
INVENTOR.
AARON F. SAMMET
BY　*Hill Sherman Meroni Gross & Simpson*　　ATTORNEYS

United States Patent Office 3,339,556
Patented Sept. 5, 1967

3,339,556
AGRICULTURAL IMPLEMENT
Aaron F. Sammet, Box 163, Princeville, Ill. 61559
Original application Nov. 28, 1961, Ser. No. 155,370, now Patent No. 3,188,786, dated June 15, 1965. Divided and this application Nov. 18, 1964, Ser. No. 412,006
8 Claims. (Cl. 130—27)

My invention relates generally to an agricultural implement. More particularly, the implement comprises an improved type combined harvester, portions of which can also be used for chopping hay and forage or as a hammer mill for grinding feed; or the whole machine can be used as a corn picker-sheller when a two row snapping head is attached.

The present application constitutes a divisional application of my earlier application filed Nov. 28, 1961, now U.S. Patent No. 3,188,786, which was a continuation-in-part of my still earlier application, Ser. No. 851,408, field Nov. 6, 1959, which latter application is now abandoned.

The invention has several purposes which will be further described under the listings of The Header, Impeller Cylinder Blower or Rotating Paddle and Chopper Bar Structure, which will do the threshing, shelling, chopping or hammer milling, and Rotating Sifter Drum or Revolving Separator.

The prime purpose and object of this invention is to provide an improved machine of such a design that this eight foot cut machine (10 ft. wide overall) is smaller and more compact than present six or seven foot cut machines of pull type. This machine can be pulled or mounted on the side of a row crop tractor.

The present construction permits exceptionally easy accessibility to any parts which might need to be repaired or to the several parts which provide change over from the different type grains to another, or the change over to a hay chopper or a hammer mill. The whole machine pivots on the wheel bearings when raising or lowering the cutter bar.

In line with the cost of this machine it can be seen that its multiple uses will greatly reduce the owner's outlay in doing several jobs with the same machine. The machine is very cheap to manufacture because of the small number of moving parts and the fact that it has no gear cases.

Other important objects of this invention are to provide an improved impeller type cylinder blower or paddle and chopper bar structure and an improved revolving separator.

The impeller type cylinder blower is mounted very low which allows the axle of the machine to be used for the rear bearing mount. The auger material control angle iron on the auger is used for the front bearing mount which is a cost reduction feature.

The large diameter (30") of the impeller cylinder provides a large threshing area since the circumference is almost eight feet. Due to this feature, complete threshing or shelling of grains is assured without the use of any concaves. One grain is threshed it merely slides along the smooth surface until discharged through the exhaust. No hulling or cracking occurs.

As the auger forces the material into the semicircular opening of the impeller housing, the four internal hammers centrifugally through the material toward the round threshing bars which further cast it outward into the path of the four sets of staggered hammers or teeth. The final threshing takes place as the material passes past the hammers and the inside periphery of the housing. Finally all material is discharged into the exhaust where it is blown via the conduit into the revolving separator. Since the whole machine pivots when raised or lowered, flexible couplings are eliminated on the conduit. The lower area of the separator is provided with an inside baffle so that all material makes one complete revolution before being discharged.

In accordance with other features of my invention, a revolving separator is provided to receive the threshed materials and straw, etc., from the round conduit (as pictured) and separates the clean grain from the straw and other foreign materials. The separator replaces conventional walking straws, racks and shaker shoes. The revolving separator is extremely simple in its mode of operation, and in the accessibility of its screens, fan controls and moving parts. It is believed that the revolving separator is an improved combination of revolving straw deck and sieve chaffer over conventional structures such as shown in W. Streich et al. U.S. Patent 2,825,455 and O. Reitman U.S. Patent 2,811,158 and R. W. Gotshall U.S. Patent 935,138. The latter patent merely shows a huge tailings device.

According to further features of the revolving separator, the conduit from the impeller cylinder blower extends into the revolving separator to within about ten inches of the closed rear portion. The blown materials are deposited against the back side and lifted by the series of circular teeth as the revolving separator turns at a speed such as 24 r.p.m. The diameter of the revolving separator may be thirty-six inches so that the speed of the air flow is reduced as it reverses it direction and comes out the open end of the same. This reduced volume of air carries the straw and chaff out the open end while the grain falls through the apertures in the appropriate screen.

Yet other features of the separator construction enable the air from the cleaning fan which follows a circular path inside the separator housing and outside of the sieves to suck the grain through the sieves. This cleaning fan does the final cleaning by blowing in a nearly vertical direction at exhaust. There is a deflecting door on the rear which is removed when the machine is used to separate heavy materials such as corn and soybeans. The clean grain falls into the small conveyor auger which transfers it crossways of the machine to the 45° auger and then to the wagon. The cross auger is preferably turned off by the turning action of the wagon tongue when turning corners to keep the grain from being deposited on the ground.

The revolving separator, according to other features of the invention, has been built so as to be economically manufacturable since one end of the separator is closed and requires only one bearing on that end. Furthermore, it is constructed so each of the three screens covers 120° of the periphery and so the screens slide in an out from the open end and are readily secured in place by one thumb screw each, along with one short piece of strap iron (18").

The circular straw rack has lifters four inches apart on the eight inch spaced circular angle irons. These lifters are angled 15° towards the open end to help work straw out of the open end.

Another feature of the invention concerns mounting the cleaning fan blades so close to the sieves that no other attachments are necessary to keep the sieves clean which feature is believed to be in contrast to prior art structures such as shown in the Reitman U.S. Patent 2,811,158.

Other objects and features of the present invention will more fully become apparent in view of the following detailed description taken in conjunction with the accompanying drawings illustrating a single embodiment and in which:

On the drawings:

FIGURE 6 is an enlarged fragmentary partially sectioned view taken substantially on the line VI—VI looking in the direction indicated by the arrows, as seen in FIGURE 1;

FIGURE 7 is an enlarged partially sectioned cross sectional view taken substantially on the line VII—VII looking in the direction indicated by the arrows, as seen in FIGURE 6;

FIGURE 8 is a fragmentary side view of a separator; and

FIGURE 9 is a side view of a hammer assembly.

As shown on the drawings:

Figures 1, 2:
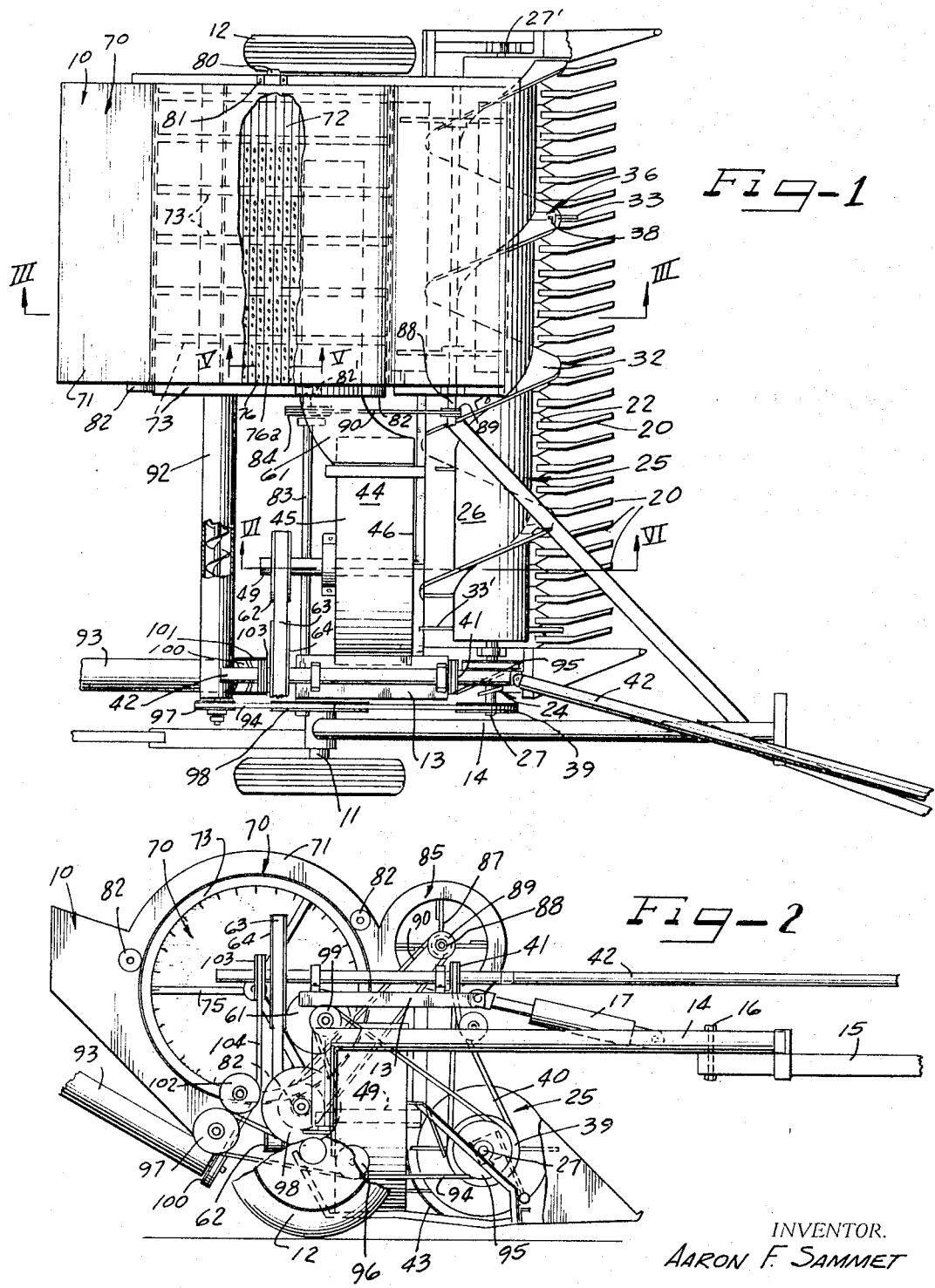
FIGURE 1 is a top plan view of an agricultural implement with parts being broken away to show certain details of my invention.
FIGURE 2 is a fragmentary side view of the agricultural implement shown in FIGURE 1.

The reference numeral 10 indicates generally an agricultural implement which may be operated as a thresher, a sheller, a chopper or hammer mill and as a revolving separator.

The implement 10 includes a main axle 11 having wheels 12 mounted at opposite ends thereof. A frame 13 is pivotally mounted on the axle 11 by means of conventional bearings (not shown). Fixedly mounted on the axle 11 is a frame hitch post 14, and a tractor hitch 15 is secured thereto by means of a fastener such as indicated at 16. Mounted on the fixed post is a cylinder which may either be of the hydraulic or pneumatic type, as illustrated at 17. The cylinder 17 is connected at its other end to the pivotal frame 13. When the agricultural implement 10 is to be set for cutting height, the operator operates the cylinder 17 to cause the frame 13 to be rotated upwardly through an arc about the main axle 11. The cylinder 17 may be operated through conventional controls to rotate the frame 13 on the axle into a road travel position.

Sickle

Mounted on the frame 13 is a sickle indicated generally at 19. The sickle 19 is constructed to cut grain as well as to cut and pick up down grain and includes axially spaced angular teeth or sickle guards 20, a reciprocal bar 21 and blades 22. The blades 22 are secured to the blade bar 21 while the teeth 20 are all fixedly attached to teeth or guard rod 23, the rod 23 being secured to the frame 13. A conventional cam-type drive 24 (FIGURE 1) is provided for reciprocating the blade and bar with respect to the fixed angular teeth or guards to effect cutting. The drive 24 may be generally of the type described on page 13 of U.S. Patent No. 2,352,257. The sickle 19 including the angular teeth 20 are angled upwardly 5° to 20° which assures that any shattered grain will be worked into pan or conveyor trough 43.

The header

Mounted virtually directly over the sickle cutter blades 22 is a transverse screw conveyor indicated generally at 25. The screw conveyor or auger 25 includes a tubular screw conveyor or auger housing 26. Driven and fixed shafts 27, 27' are journalled on bearings (not shown) in the frame 13 and on the auger housing 26. Housing brackets (not shown) are provided on the housing 26 so that the housing 26 will co-rotate with the driven shaft 27, the brackets (not shown) being secured at outer ends to the housing 26.

A fixedly and eccentrically mounted beater rod support shaft 30 is disposed interiorly of the housing 26, the shaft 30 being eccentric to the central axis of the housing 26 and drive shaft 27.

Welded or otherwise suitably secured to the exterior of the housing 26 is an auger blade 32 which is adapted to cause material cut by the sickle 19 to move from right-to-left, as shown in FIGURE 1. Cooperable with the blade 32 are a series of axially and circumferentially spaced rigidly mounted rotating beater rods or fingers 33 and 33'. Radially inner ends of the beater rods 33 are provided with bearings 34 and the fixed beater rod support shaft 30 extends transversely through the bearings 34 enabling each of the beater rods 33 to rotate on its eccentric axis. Outer ends of the beater rods 33 extend through conveyor housing openings 35 (FIGURE 6) and several guide means 36 are mounted on the blade 32 to enable relative movement between the housing 26 and the beater rods 33. The several guide means 36 each include a bracket 37 secured to the blade 32 and a ball and socket connection 38 disposed between the bracket 37 and the associated rod 33. By providing a ball and socket connection between the outer end of the rod 33 and the screw support bracket 37, eccentric rotation of the beater rods 33 is facilitated. The rods 33' revolve with the housing and are welded at radially inner ends directly to the housing 26 in contrast to the eccentrically mounted rods 33.

A pulley 39 is mounted on the auger housing support shaft 27 which is connected by means of a belt 40 to a pulley 41 mounted on a tractor power take off 42 as shown in FIGURES 1 and 2. The screw conveyor 25 and the conveyor trough 43 enable materials cut by the sickle to be swept and moved transversely with respect to the sickle and then conveyed into a rotating paddle and chopper bar structure as indicated at 44.

Impeller cylinder blower or rotating paddle and chopper bar structure

Mounted on the frame 13 rearwardly of the discharge end of the auger 25 is an impeller cylinder blower or rotating paddle and chopper bar structure or hammer structure 44. The structure 44 includes a housing 45 having an inlet 46 disposed opposite the discharge end of the auger blade 32. Mounted within the housing 45 is a rotary paddle and chopper or chopper 47. The chopper 47 includes a bearing structure having a pair of bushings 48, 48' carried on a rotary paddle and chopper drive shaft 49. A sleeve 50 is secured to the bushings 48, 48'. The drive shaft 49 is mounted on bearings 51, 51' disposed at opposite ends of the structure 44 and carried on the frame 13. The bearing 51 is also mounted by means of a bracket 52 on the housing 45.

A backplate 53 is welded to the sleeve 50 and tubular rods 54 are circumferentially spaced and each welded or otherwise suitably secured at one end to the backplate 53 and at an opposite end to a ring 55. Also mounted on the sleeve 50 are circumferentially spaced pairs of hammer lugs 56. Hammers or choppers 57 are each secured at one end between the lugs 56 by means of suitable fasteners indicated at 57a in FIGURE 7.

Also mounted within the housing 45 are a series of circumferentially spaced baffles 58 which are welded to the backplate 53 and to the sleeve 50. These baffles or paddles operate to beat up material conveyed into the paddle or baffle and chopper bar chamber indicated generally at 47'. It will be appreciated that the conveyor 25 functions to cause the cut material to move axially across and then rearwardly of the pan 43 through the housing inlet 46 into the chamber 47'. This material is then beat up by the hammers 57 and by the baffles 58 and then caused to be centrifugally discharged through discharge opening 59 (FIGURE 7) into a chute disposed about the opening 59 and then into a conduit 61 leading to another apparatus to be hereafter described. The paddle and chopper bar or hammer drive shaft 49 has a pulley 62 mounted thereon and a belt 63 connects the pulley 62 with another pulley 64 mounted on the power take off 42.

In order to further beat up the material within the chamber 47′, a series of small hammers 65 are disposed at circumferentially spaced points at the perimeter of the rotary chopper structure 47. To this end, the hammers 65 are provided with tubular hammer ends 66 and hammer rods 67 extend through the tubular hammer ends 66. The hammer rods 67 are secured at opposite ends with the plate 53 and with the ring 55. Each of the hammers 65 extends generally radially outwardly of the backplate 53, the rods 54, the ring 55, as well as outwardly of the hammers 57 and the baffles 58. The small hammers 65 are disposed in close proximity to the housing 45. If desired, the small hammers 65 may be turned so as to extend circumferentially of the rotary chopper structure 47 instead of radially of the rotary chopper structure 47 and then locked in the circumferential position as indicated by the dotted lines representing the hammer 65 at the bottom of the rotary chopper structure 47.

As the auger blade 32 forces the material into the semicircular inlet opening 46, the four internal hammers 57 throw the material toward the round threshing bars 54 which further cast the material radially outwardly into the path of the four sets of staggered smaller radially outer hammers 65. The smaller hammers 65 operate to finally thresh the material and to cause it to pass outwardly through the discharge opening 59. The baffles 58 function to assist in beating up the material within the chamber 47′, and they cooperate with baffle shield 43a to provide means to insure that all material within the chamber makes one complete revolution before it is discharged through the discharge opening 59. Since the material coming into the housing is first contacted by the inside hammers 57 and thrown outward, it can be seen that it will not be discharged until it passes the area of the baffle shield 43a, or a little over one revolution.

The external hammers 65 are of such length that spacers may be inserted on each end to make the teeth follow a single path for hay chopping or they may be staggered. They may be locked in extended position by inserting one long bolt and a cotter key or locked out of position so only the round bars do the threshing of soy beans and for corn shelling.

Where the machine is to be used as a hay chopper, a grate 68 is suitably attached to the housing 45 over the discharge opening 59 and the conduit 61 is disconnected from the chute 60. As the hay is chopped within the chamber 47′, it is then caused to be urged through the grate 68 outwardly through the conduit 61 and into a trailing wagon (not shown). A discharge spout may be mounted on the chute 60 to facilitate transfer of the chopped material from the conduit 61 to the trailing wagon.

To use the paddle structure 44 as a hammer mill, the driving mechanisms to the header and to the revolving separator (to be hereafter described) would be disengaged. A grate such as grate 68 would be mounted over the discharged opening 59. The hammers would be locked in extended position or permitted to swing free and a hammer mill cyclone apparatus would be attached to the chute 60.

The grate 68 is provided with hollow ground cemented carbide tips 69 which are cemented thereon to further facilitate chopping of grain material. The grate is reversible as the carbide tips 69 would not be needed on dry material or when grinding an ear of corn. Where the apparatus 10 is to be used as a harvester, the grate 68 will be removed from the machine by sliding the grate 68 from underneath grate guides 67a, 67a after housing cover 47a has been pivoted on hinge 47b to expose the grate 68.

*Rotating sifter drum or revolving separator*

Figure 3:
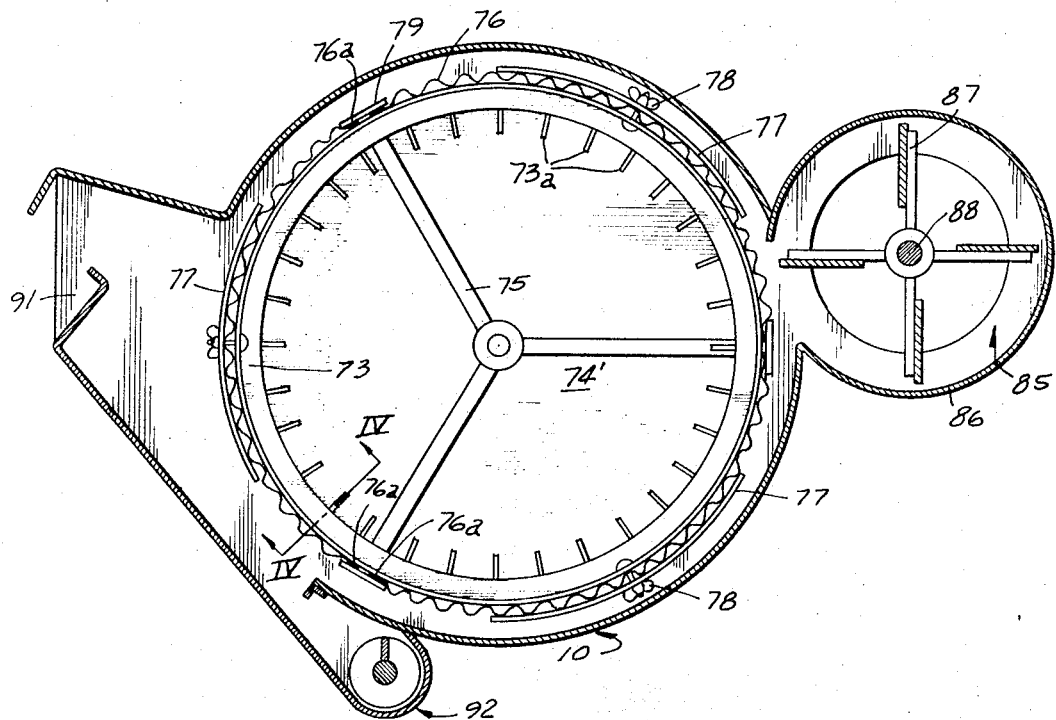
FIGURE 3 is an enlarged fragmentary cross sectional view taken substantially on the line III—III looking in the direction indicated by the arrows, as seen in FIGURE 1.
Figure 5:
FIGURE 5 is an enlarged detail section taken substantially on the line V—V looking in the direction indicated by the arrows, as seen in FIGURE 1.
Figure 4:
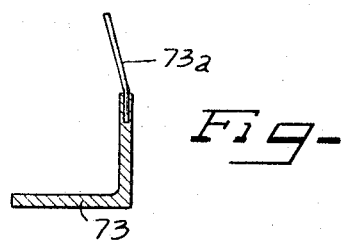
FIGURE 4 is an enlarged detailed section taken substantially on the line IV—IV looking in the direction indicated by the arrows, as seen in FIGURE 3.

A revolving sifter drum or separator is indicated generally at 70 and the details of this mechanism are best illustrated in FIGURE 3. The separator 70 includes a separator housing 71 having a rotary drum 72 journalled therein. The drum 72 is comprised of a series of axially spaced drum rings 73. The drum further includes a drum end plate 74′ having a brace 75. Three arcuate corrugated pieces or screens 76 are mounted on the drum rings 73. In order to secure the screens 76 on the drum 72, three arcuate outside drum strips 77 are engaged against the outer surfaces of the screens 76 and a single fastener 78 is provided for securing each screen 76 and its associated strip 77 to a leg of one of the angular drum rings 73. In order to anchor the ends of the arcuate corrugated pieces or screens 76, plates or bands 79 are welded to the drum ring 73 at axially spaced intervals. The plates 79 are spaced at opposite ends with respect to the drum rings and screen ends 76a are underlapped underneath the small plate 79 to anchor the screen end 76a onto the drum 72. As is shown in FIGURE 5, each of the corrugated pieces or screens 76 has a series of screen holes 76b disposed in the valleys of the corrugated pieces or screens 76.

The drum end plate 74′ has a stub shaft 80 secured to it which shaft is journalled in bearings 81 provided on the housing 71.

Mounted at an open end of the drum on the housing 71 are a series of guide rollers 82 and a drive roller 82′ (FIGURE 1). The drive roller 82′ has a drive shaft 83 and a pulley 84 is mounted thereon. As the drive shaft 83 is rotated, the drive roller 82′ provides a friction drive for the drum 72. As the drum 72 is driven, the rollers 82 are engaged with the axially outermost drum ring 73.

Mounted at one side of the separator housing 71 is a blower fan 85. The blower 85 includes a blower housing 86 which is suitably attached to the separator housing 71. Disposed internally of the housing 86 is an impeller 87 mounted on a drive shaft 88 having a pulley 89 at its outer end. The blower pulley 89 is connected to the separator pulley 84 by means of a pulley belt 90.

The conduit from the impeller cylinder blower extends into the revolving separator 70 to within about ten inches of the closed end plate 74′. The blown materials are deposited against the backside of the drum 72 and lifted by the straw lifters or teeth 73a as the revolving separator drum 72 is rotated. The revolving separator drum 72 is rotated at 24 r.p.m. The diameter of the drum is thirty-six inches and when operated it causes the speed of the air flow from the blower 85 to be reduced as it reverses its direction and comes out shaft housing outlet 91. While the reduced volume of air carries the straw and chaff out the outlet 91, the grain falls through screen apertures or holes 76b. The drum reduces the speed of the air flow because the conduit 61 has a relatively small cross-sectional area as compared to the cross sectional area of the inside of the drum 72. As the high-speed air flows from the conduit 61 and strikes the rear of the drum 72 and spreads out into the large area of the drum, the flow speed is substantially reduced. This has worked well as proven by field tests.

As the grain is discharged from the drum 72, it falls into an auger conveyor or cross conveyor 92 mounted on a parallel axis with respect to the axis of the separator 70. The transverse conveyor 92 has a discharge opening in communication with a wagon auger 93 which is adapted to carry the grain from the implement 10 and allow it to fall into a wagon (not shown) disposed behind the implement.

To drive the separator drive pulley or roller 82′, a pulley belt 94 is stretched over drive pulley 95, which is driven by the belt 40 from the power take off 42 through pulley 39 and shaft 27. The belt 94 is also stretched over idler pulley 96, cross auger pulley 97, roll drive pulley 98 and idler pulley 99, to drive cross auger 92 and the separator 70. The belt 90 is operated off the shaft 83 carrying the thus driven roll drive pulley 82′ to drive the blower 85.

To drive the wagon auger 93, it is provided with a wagon auger pulley 100, a belt 101, an idler pulley 102 and a power take off pulley 103. The belt 101 is driven by pulley 103 to operate the wagon auger pulley 100.

In summation, it will be appreciated that I have provided a chopper mechanism as well as a separator that embody novel features as already described and as hereafter claimed.

While I have shown and described a commercial embodiment of my novel apparatus, it will be understood that the same is capable of modification, and that modification may be made without departure from the spirit and scope of the invention as defined in the claims.

I claim as my invention:

1. An agricultural implement including
   a housing having an inlet and an outlet at one side,
   a rotary structure disposed in said housing at one side of said outlet including a drive shaft having a first set of hammers mounted circumferentially thereon,
   threshing bars carried at the perimeter of said structure with said hammers being adapted to cast material thereagainst, and
   a second set of hammers mounted on said rotary structure and extending radially outwardly of said threshing bars in close proximity to said housing for beating up material and casting it through said outlet.

2. An agricultural implement including
   a housing having an inlet and an outlet at one side,
   a rotary structure disposed in said housing at one side of said outlet including a drive shaft having a first set of hammers mounted circumferentially thereon,
   threshing bars carried at the perimeter of said structure with said hammers being adapted to cast material thereagainst, and
   a second set of hammers mounted on said rotary structure and extending radially outwardly of said threshing bars in close proximity to said housing for beating up material and casting it through said outlet,
   said rotary structure having a series of baffles mounted in its interior in axially confronting relation to said first set of hammers for carrying the material in the drum for at least one revolution of the drum before centrifugally discharging the material through said outlet.

3. An agricultural implement including
   a housing having an inlet and an outlet at one side,
   a rotary structure disposed in said housing at one side of said outlet including a drive shaft having a first set of hammers mounted circumferentially thereon,
   threshing bars carried at the perimeter of said structure with said first set of hammers being adapted to cast material thereagainst, and
   a second set of hammers mounted on said rotary structure and extending radially outwardly of said threshing bars in close proximity to said housing for beating up material and casting it through said outlet, said second set of hammers being movable from a radial position and securable in a circumferential direction.

4. An agricultural implement including
   a housing having an inlet and an outlet at one side,
   a rotary structure disposed in said housing at one side of said outlet including a drive shaft having a first set of hammers mounted circumferentially thereon,
   threshing bars carried at the perimeter of said structure with said first set of hammers being adapted to cast material thereagainst,
   a second set of hammers mounted on said rotary structure and extending radially outwardly of said threshing bars in close proximity to said housing for beating up material and casting it through said outlet, and
   a grate mounted over said outlet biasing sharpened tips to further chop grain material.

5. An agricultural implement including a housing having an inlet and an outlet at one side,
   a rotary structure disposed in said housing at one side of said outlet including a drive shaft having a first set of hammers mounted circumferentially thereon,
   threshing bars carried at the perimeter of said structure with said hammers being adapted to cast material thereagainst,
   a second set of hammers mounted on said rotary structure and extending radially outwardly of said threshing bars in close proximity to said housing for beating up material and casting it through said outlet, and
   a grate mounted over said outlet to further chop material.

6. The implement of claim 5 further characterized by said second set of hammers being locked in position to extend in a radial direction.

7. The implement of claim 5 further characterized by said second set of hammers being mounted for free swinging movement.

8. An agricultural implement including a housing having an inlet and an outlet at one side,
   a rotary structure disposed in said housing at one side of said outlet including a drive shaft having a first set of hammers mounted circumferentially thereon,
   threshing bars carried at the perimeter of said structure with said hammers being adapted to cast material thereagainst,
   a second set of hammers mounted on said rotary structure and extending radially outwardly of said threshing bars in close proximity to said housing for beating up material and casting it through said outlet,
   said rotary structure having a series of baffles mounted in its interior in axially confronting relation to said first set of hammers for carrying the material in the drum for at least one revolution of the drum before centrifugally discharging the material through said outlet, and
   a grate mounted over said outlet to further chop material.

References Cited

UNITED STATES PATENTS

| | | | |
|---|---|---|---|
| Re. 17,120 | 10/1928 | Keith | 146—107 |
| 945,160 | 1/1910 | Goetz | 241—86 |
| 1,907,344 | 5/1933 | Climer | 209—295 |
| 2,308,578 | 1/1943 | White et al. | 241—86 |
| 2,503,416 | 4/1950 | Russell | 56—1 |
| 2,644,284 | 7/1953 | Oberholtz et al. | 56—21 |
| 2,651,471 | 9/1953 | Noll | 241—86 |
| 2,670,582 | 3/1954 | Hyman | 56—21 |
| 2,770,937 | 11/1956 | Huddle | 56—1 |
| 2,822,812 | 2/1958 | Edwards | 56—21 |
| 2,848,029 | 8/1958 | West | 146—107 |
| 2,915,182 | 11/1959 | Burnet et al. | 209—294 |
| 2,938,557 | 5/1960 | Campbell | 146—107 |

ABRAHAM G. STONE, *Primary Examiner.*

RUSSELL R. KINSEY, *Examiner.*